Jan. 7, 1941.    J. P. JOHNSON    2,227,501
OIL SEPARATOR
Filed Jan. 11, 1939
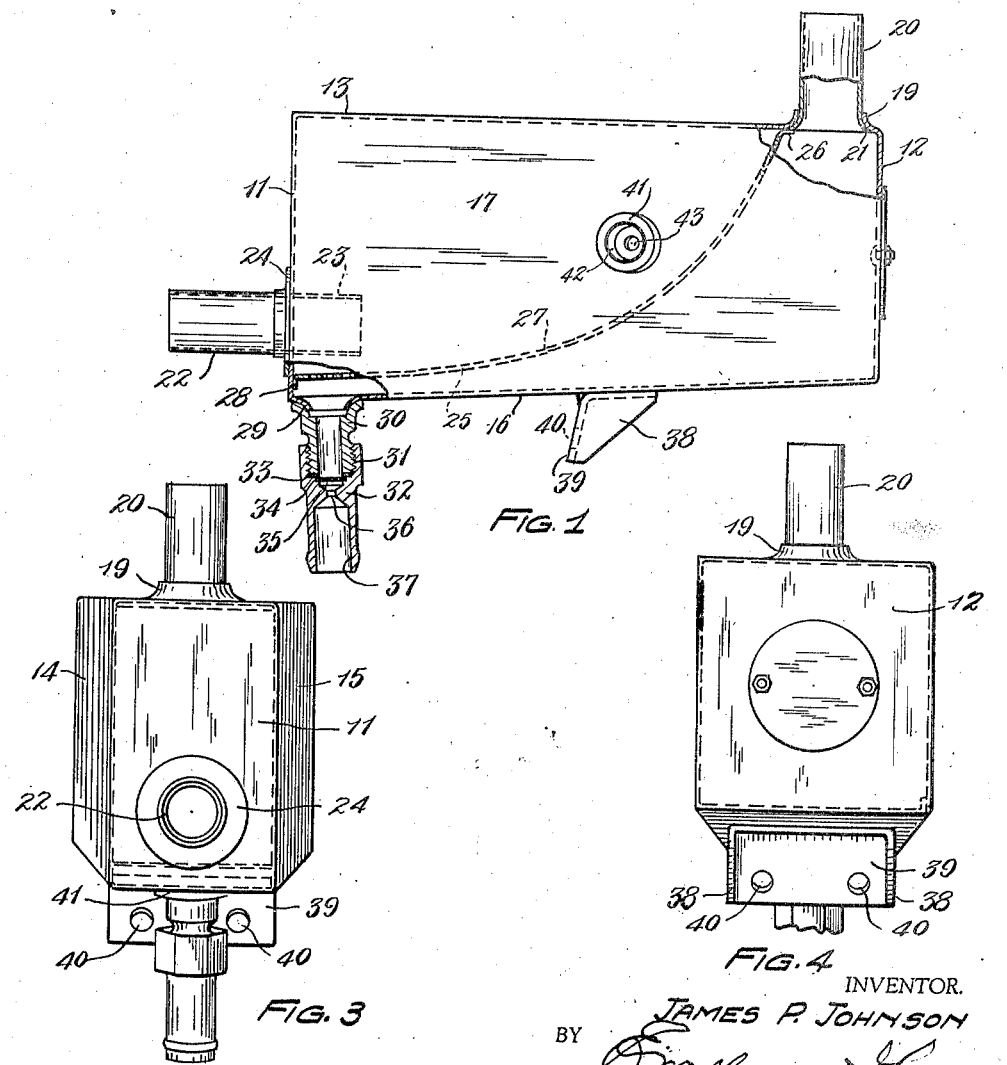
INVENTOR.
JAMES P. JOHNSON
BY
ATTORNEY.

Patented Jan. 7, 1941

2,227,501

UNITED STATES PATENT OFFICE 2,227,501

OIL SEPARATOR

James P. Johnson, Shaker Heights, Ohio, assignor, by mesne assignments, to Pump Engineering Service Corporation, Cleveland, Ohio, a corporation of Ohio Application January 11, 1939, Serial No. 250,431

5 Claims. (Cl. 183—109)

This invention relates to oil separators and more particularly to one designed especially for use on aircraft although the novel features may be otherwise adapted by those skilled in the art.

An object of the present invention is to provide an oil separator of compact light weight construction, highly efficient in recovery of oil and one which has no movable parts thus eliminating wear and replacements.

Another object of the present invention is to provide a fluid tight container having an oil filtering means so disposed with reference to the incoming oil ladened air that a swirl is effected throwing the oil particles against the filtering means through which the oil passes and from where it is recovered and returned to the engine crank-case or other reservoir for further use.

Another object of the present invention is to form the oil filtering means with sufficient area to slow up the velocity of the incoming oil ladened air to allow the oil particles to adhere thereto and filter through the means.

Another object of the present invention is to provide an oil separator which is simple in construction, efficient in operation and inexpensive to manufacture.

With the objects above indicated and other objects hereinafter explained in view, my invention consists in the construction and combination of elements hereinafter described and claimed.

Referring to the drawing,

Figure 1 is a side elevational view of an oil separator embodying the present invention and having portions thereof broken away to more clearly illustrate details of the structure.

Figure 2 is a top plan view of the separator shown in Figure 1 and likewise having a broken portion to better disclose the filtering means.

Figure 3 is an end elevational view of the separator looking into the left hand end of Figure 1.

Figure 4 is an end elevational view of the separator similar to Figure 3 but looking into the right hand end of Figure 1.

In the drawing I have illustrated an oil separator embodying the present invention and while the novel features may be otherwise adapted, for the particular use for which this separator is intended the preferred structure will be described. For clarification as to the relative sizes and proportions of the oil separator elements, it might be well to state that the accompanying drawing illustrates the separator on approximately a three quarter scale so as to visualize the efficiency of the separator particularly in view of the quantity of oil consumed by the vacuum pump during its operation. The question of air supply is relatively unimportant but the question of lubricating oil is of material importance and, therefore, whatever oil, which has been used for lubricating purposes, can be recovered and reused results in a material savings in operating expense. The oil separator is, therefore, designed for this purpose and connected with the discharge side of the vacuum pump and into which the oil ladened air is directed and separated in a manner to be later described.

The separator comprises a hollow container 10 preferably made from low brass thin sheet material. The container includes a front end wall 11 vertically disposed and a rear end wall 12 spaced longitudinally therefrom but in parallel relation. A top wall 13 extends between the front and rear walls 11 and 12 and is disposed horizontally at right angles with respect to the adjacent end walls. The top wall 13 has tapered sides 14 and 15 which extend divergingly between the front and rear walls respectively. A bottom wall 16 is disposed beneath the top wall 13, having similarly angled sides, and extends at an inclining angle from the front wall 11 to the rear wall 12 as more clearly shown in Figure 1. Side walls 17 and 18 extend between the front and rear walls in a vertical position and between the top and bottom walls along the angularly disposed edges. The manner of forming this container is of no material importance as many different and well known methods may be employed but by whatever manner it is formed all connecting edges or joints must be either brazed or soldered and if the latter preferably with silver solder. It is important however that the container be fluid tight when subjected to pressure internally or externally in order to maintain the efficiency of the separator.

The top wall 13, adjacent the rear wall 12, is provided with a transversely extending opening surrounded by an outwardly projecting annular flange 19, more clearly shown in Figures 2 and 3. A short section of brass tubing 20 projects outwardly from the opening in the top wall and has its lower edge bent outwardly at 21 for cooperative engagement with the flange 19. These cooperating flanges 19 and 21 should likewise be soldered or brazed for the reason already explained. This tubular member 20 has a relatively large cross section unrestricted to the flow of air and is adapted for communication with the outside atmosphere or for connection with de-icer bags when the same are being used upon the plane. The front wall 11 has a similar opening at its lower portion within which a tubular member 22 is disposed, but in this case the inner end of the tube projects inwardly at 23 for a substantial distance beyond the wall. A mounting flange 24 encircles the tube 22 and is secured to the adjacent portion of the end wall 11 as well as to the adjacent portion of the tube by brazing or soldering. This tube likewise is of substantial size and preferably of the diameter of the tube 20, the tubes being disposed relatively at right angles, the outer end of the tube 22 being adapted for connection with the discharge side of the vacuum pump. An oil filtering member 25 is disposed transversely within the container, thus separating the inlet opening 22 from the air outlet opening 20 thereby requiring the incoming fluid to pass through the filtering member. In the present instance the filtering member 25 comprises a perforated brass sheet relatively thin and whose perforations are small and numerous. The type of sheet employed has holes .033" in diameter, there being 225 such holes to the square inch, the holes being arranged relatively in staggered relation. The sheet has its upper end bent to form a flange 26 which is secured to the underside of the top wall 13 transversely thereof and directly ahead of the air outlet opening 20. This flange 26 is likewise connected by brazing or soldering as desired. The body portion of the perforated sheet is bent so as to form a curved relatively flat surface 27 depending from the air outlet opening 20 to beneath the inlet opening 22, the front end of the perforated sheet having a depending flange 28 which extends transversely and is connected to the inside of the front wall 11 substantially midway between the adjacent edge of the end 23 of the tube and the bottom wall 16 as more clearly shown in Figure 1. This connection likewise is made by brazing or soldering as desired. The perforated sheet likewise is tacked at different portions along its opposite edges to the adjacent portions of the side walls 14 and 15 so as to maintain the perforated sheet in proper position. It has been found in practice that best results are obtained if the upper portion of the perforated sheet is bent about a radius approximately $3\frac{7}{16}$" struck from a center approximately $1\frac{5}{8}$" above the top surface of the top wall 13 and the lower portion bent approximately about a radius of $12\frac{1}{4}$" struck from a center above and in a continuation of the plane of the end wall 11. The curving of this perforated sheet imparts a very desirable swirl to the incoming oil ladened air and by widening out the rear portion of the container as described, sufficient area to the perforated sheet is provided for slowing up the velocity at which the oil ladened air is introduced into the separator. Likewise as the oil particles are deposited upon the perforated sheet they tend to adhere thereto and pass through the perforations into the bottom of the container. The oil freed air also passes through the perforated sheet and is discharged through the opening 20. While it is true that all of the oil in the discharged air has not been removed, tests have shown, however, that due to the construction and arrangement of elements the efficiency of the oil separated runs between 80 and 95 percent.

To recover the separated oil and to return it to the engine crank-case or other reservoir, the bottom wall 16, adjacent the front wall is provided with an opening having an outwardly extending annular flange 29 to which is secured an oil outlet tube 30 having an exteriorly screwthreaded end 31, the tube 30 being connected to the flange by brazing or soldering as desired. A nipple 32 has an interiorly screwthreaded bore in one end threadably mounted upon the screwthreaded end of the outlet tube and a gasket 33 for sealing the connection therebetween. The nipple is provided with a bore 34 to receive a strainer 35 extending transversely across the opening and held in place by the gasket 33. The nipple is also provided with an axial opening 36 of restricted diameter which communicates on one side with the outlet opening and on the opposite side with an outlet bore 37 of larger diameter. To the free end of this nipple 32 a conduit is attached which connects with the engine crank-case or other oil reservoir. It is important that this line slope downwardly slightly toward the engine to prevent oil trapping. Likewise it is important when the oil separator is mounted upon the plane that the lower wall 16 be inclined approximately 15 degrees above horizontal when the plane is in flying position. To attach the oil separator to the plane a mounting bracket 38 is provided on the bottom wall 16 and has a depending flange 39 projecting downwardly at an angle. The flange 39 is provided with openings 40 by means of which the bracket can be suitably connected to the supporting structure. This bracket is connected to the bottom wall by means of brazing or soldering as desired. If desirable the interior of the separator may be connected with a pressure gauge to indicate the fluid pressure therein so as to eliminate the possibility of excessive pressure. In this case the side wall 17 has an extension 41 brazed or soldered thereto and the latter being provided with an interiorly screwthreaded bore 42 which communicates with an axially disposed opening 43 extending transversely through the end wall and affording communication with the interior thereof. This extension can be connected with the pressure gauge or if a pressure gauge is not desirable the opening may be closed by the use of a screwthreaded plug, not shown.

It is not believed necessary to enter into a detailed description of the operation of the oil separator due to the rather elaborate description heretofore. It will be sufficient to say that the incoming oil ladened air discharged from the vacuum pump enters the tube 22 and is discharged through the opposite end 23 into contact with a flat screen baffle which has sufficient area to slow up the velocity and allow the oil to adhere thereto passing through the perforated sheet and dropping onto the bottom of the container, where the inclination of the bottom wall causes the oil to flow toward the oil discharge outlet. Due to the shape of the perforated sheet a swirling action is imparted to the incoming oil ladened air which tends to separate the oil particles and clarify the air. The substantially oil freed air is then forced out through the air outlet opening 20 either to atmosphere or to de-icer bags when being used. The oil passes outwardly through the discharge opening through the strainer so as to free it of foreign matter and subsequently through the nipple to the engine crank-case. In the event that foreign matter gathers in the oil discharge tube 30, it is only necessary to remove the nipple by unscrewing the same and permitting the foreign matter to pass out through the then unrestricted opening. The strainer may also be cleaned and replaced or, in the event of permanent clogging or damage, a new one may be substituted.

While I have described the preferred embodiment of the invention it is to be understood that I am not to be limited thereto inasmuch as changes and modifications may be resorted to without departing from the spirit of the invention as defined in the appended claims.

What is claimed is:

1. An oil separator for separating oil from oil ladened air comprising a closed container including vertically disposed relatively spaced end walls, vertically disposed relatively spaced side walls, and relatively spaced transversely disposed top and bottom walls, one of said end walls having an inlet opening adjacent said bottom wall through which oil ladened air is introduced under pressure, said top wall having an outlet opening adjacent the end wall opposite said inlet opening through which the oil freed air is discharged, a relatively thin sheet member disposed transversely within said container and having its opposite sides connected to the adjacent faces of said side walls, one end of said sheet member being connected to the end wall below said inlet opening and the opposite end connected to the top wall inwardly of said outlet opening for separating said inlet opening from said outlet opening, said sheet member being perforated to permit the flow of oil and air thereby and disposed with respect to the incoming oil ladened air that the velocity of the latter is so reduced that the oil particles adhere to said member, passing through the perforations into the bottom of said container, while the oil freed air is discharged through said air outlet opening, and means on said container for drawing off the recovered oil.

2. An oil separator for separating oil from oil ladened air comprising a closed container including vertically disposed relatively spaced end walls, vertically disposed relatively spaced side walls, and relatively spaced transversely disposed top and bottom walls, one of said end walls having an inlet opening adjacent said bottom wall through which oil ladened air is introduced under pressure, said top wall having an outlet opening adjacent the end wall opposite said inlet opening through which the oil freed air is discharged, a relatively thin sheet member disposed transversely within said container and having its opposite sides connected to the adjacent faces of said side walls, one end of said sheet member being connected to the end wall below said inlet opening and the opposite end connected to the top wall inwardly of said outlet opening for separating said inlet opening from said outlet opening, said sheet member being relatively flat transversely but curving upwardly from said inlet opening toward said outlet opening, said sheet member being perforated to permit the flow of oil and air thereby and disposed with respect to the incoming oil ladened air that the velocity of the latter is so reduced that the oil particles adhere to said member, passing through the perforations into the bottom of said container, while the oil freed air is discharged through said air outlet opening, and means on said container for drawing off the recovered oil.

3. An oil separator for separating oil from oil ladened air comprising a closed container including vertically disposed relatively spaced end walls, vertically disposed side walls extending longitudinally in angular spaced relation, and relatively spaced transversely disposed top and bottom walls, one of said end walls having an inlet opening adjacent said bottom wall through which oil ladened air is introduced under pressure, said top wall having an outlet opening adjacent the end wall opposite said inlet opening through which the oil freed air is discharged, a relatively thin sheet member disposed transversely within said container and having its opposite sides connected to the adjacent faces of said side walls, one end of said sheet member being connected to the end wall below said inlet opening and the opposite end connected to the top wall inwardly of said outlet opening for separating said inlet opening from said outlet opening, said sheet member being perforated to permit the flow of oil and air thereby and disposed with respect to the incoming oil ladened air that the velocity of the latter is so reduced that the oil particles adhere to said member, passing through the perforations into the bottom of said container, while the oil freed air is discharged through said air outlet opening, and means on said container for drawing off the recovered oil.

4. An oil separator for separating oil from oil ladened air comprising a closed container including vertically disposed relatively spaced end walls, vertically disposed relatively spaced side walls, and relatively spaced transversely disposed top and bottom walls, said bottom wall being inclined from front to back, one of said end walls having an inlet opening adjacent said bottom wall through which oil ladened air is introduced under pressure, said top wall having an outlet opening adjacent the end wall opposite said inlet opening through which the oil freed air is discharged, a relatively thin sheet member disposed transversely within said container and having its opposite sides connected to the adjacent faces of said side walls, one end of said sheet member being connected to the end wall below said inlet opening and the opposite end connected to the top wall inwardly of said outlet opening for separating said inlet opening from said outlet opening, said sheet member being perforated to permit the flow of oil and air thereby and disposed with respect to the incoming oil ladened air that the velocity of the latter is so reduced that the oil particles adhere to said member, passing through the perforations into the bottom of said container, while the oil freed air is discharged through said air outlet opening, and means on said container for drawing off the recovered oil.

5. In a separator for separating oil from oil-ladened air including a closed elongated sheet metal housing formed with an inlet port in one end portion thereof through which oil-ladened air may be introduced under pressure and formed at the other end portion thereof with an outlet port for the discharge of oil-freed air, the combination therewith of a sheet metal baffle partition within said housing extending completely across the inside of said housing and dividing the same into a first compartment containing said inlet port, and a second compartment containing said outlet port, said partition extending lengthwise of said housing in a curved path from a point adjacent and below said inlet port to a second point of higher elevation adjacent said outlet port and between said outlet port and said inlet port, said partition containing a plurality of perforations for the purpose of permitting the flow of oil and air therethrough but functioning to reduce the velocity and cause the separation of the oil from the air, the oil settling into the lower portion of said second compartment, the oil-freed air being removed through said outlet port and means in communication with said second compartment for drawing off the separated oil.

JAMES P. JOHNSON.